(12) United States Patent
Kashiwagi et al.

(10) Patent No.: US 10,845,376 B2
(45) Date of Patent: Nov. 24, 2020

(54) INFORMATION PROCESSING DEVICE, ELECTRONIC DEVICE, AND CONTROL METHOD FOR INFORMATION PROCESSING DEVICE

(71) Applicant: SHARP KABUSHIKI KAISHA, Sakai (JP)

(72) Inventors: Tohru Kashiwagi, Sakai (JP); Masatoshi Noma, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 202 days.

(21) Appl. No.: 16/087,631

(22) PCT Filed: Feb. 13, 2017

(86) PCT No.: PCT/JP2017/005076
§ 371 (c)(1),
(2) Date: Sep. 21, 2018

(87) PCT Pub. No.: WO2017/163662
PCT Pub. Date: Sep. 28, 2017

(65) Prior Publication Data
US 2019/0107550 A1    Apr. 11, 2019

(30) Foreign Application Priority Data

Mar. 25, 2016    (JP) .................................. 2016-062768

(51) Int. Cl.
*G01P 13/00*        (2006.01)
*G06F 3/01*         (2006.01)
(Continued)

(52) U.S. Cl.
CPC .......... *G01P 13/00* (2013.01); *G01P 15/0802* (2013.01); *G06F 1/1626* (2013.01);
(Continued)

(58) Field of Classification Search
CPC ........................... G01P 15/0802; G06F 1/3234
See application file for complete search history.

(56) References Cited

U.S. PATENT DOCUMENTS

2012/0262372 A1* 10/2012 Kim ...................... G06F 3/0304
                                                        345/158
2014/0221051 A1*  8/2014 Oguri .................. H04W 52/027
                                                        455/566
(Continued)

FOREIGN PATENT DOCUMENTS

CN        104056443 A      9/2014
CN        104571529 A      4/2015
(Continued)

OTHER PUBLICATIONS

Office Action for U.S. Appl. No. 15/572,462; dated May 9, 2019.
(Continued)

*Primary Examiner* — Paul M. West
*Assistant Examiner* — Mark A Shabman
(74) *Attorney, Agent, or Firm* — ScienBiziP, P.C.

(57) ABSTRACT

An aspect of the present invention more reliably prevents a false detection of lifting of the electronic device, in an information processing device mounted on an electronic device. A first lifting determination section (64A) determines that a mobile terminal (1) has been lifted, in a case where the following conditions (i) and (ii) are satisfied after a manner of change in acceleration detected by an acceleration sensor (11) over time has satisfied a predetermined acceleration condition: (i) a standstill determination section (63) determines that the mobile terminal (1) is in a standstill state; and (ii) a result of detection by a proximity sensor (14) indicates a transition from proximity to non-proximity within a predetermined time range, the predetermined time range being set with reference to a standstill determination
(Continued)

completion time point at which the standstill determination section (63) has completed determination.

8 Claims, 8 Drawing Sheets

(51) Int. Cl.
  *G06F 3/0346* (2013.01)
  *G06K 9/00* (2006.01)
  *G06F 1/16* (2006.01)
  *G06F 1/3231* (2019.01)
  *G01P 15/08* (2006.01)
  *G01P 15/00* (2006.01)
  *G06F 3/041* (2006.01)
  *H04M 1/725* (2006.01)

(52) U.S. Cl.
  CPC .............. *G06F 1/3231* (2013.01); *G06F 3/01* (2013.01); *G06F 3/0346* (2013.01); *G06K 9/0055* (2013.01); *G01P 15/00* (2013.01); *G06F 3/041* (2013.01); *G06F 2203/04108* (2013.01); *H04M 1/72569* (2013.01); *H04M 2250/12* (2013.01)

(56) References Cited

U.S. PATENT DOCUMENTS

| | | |
|---|---|---|
| 2014/0288681 A1 | 9/2014 | Watanabe |
| 2014/0349632 A1 | 11/2014 | Chan et al. |
| 2015/0354967 A1 | 12/2015 | Matsushita |

FOREIGN PATENT DOCUMENTS

| | | |
|---|---|---|
| JP | 2007-080219 A | 3/2007 |
| JP | 2009-236535 A | 10/2009 |
| JP | 2010-009498 A | 1/2010 |
| JP | 2013-069027 A | 4/2013 |
| JP | 2013-232816 A | 11/2013 |
| JP | 2013-232826 A | 11/2013 |
| JP | 2014-038037 A | 2/2014 |
| JP | 2015-061299 A | 3/2015 |

OTHER PUBLICATIONS

Advisory Action dated Feb. 26, 2020 for U.S. Appl. No. 15/572,462.
Co-pending letter regarding related co-pending U.S. Appl. No. 15/572,462 and U.S. Appl. No. 16/087,620.
Final Office Action dated Nov. 12, 2019 for U.S. Appl. No. 15/572,462.
Office Action for U.S. Appl. No. 16/087,620, dated Apr. 4, 2019.
Final Office Action dated Oct. 16, 2019 for U.S. Appl. No. 16/087,620.

* cited by examiner

FIG. 9

INFORMATION PROCESSING DEVICE, ELECTRONIC DEVICE, AND CONTROL METHOD FOR INFORMATION PROCESSING DEVICE

TECHNICAL FIELD

The present invention relates to an information processing device which detects that an electronic device has been lifted.

BACKGROUND ART

Recent mobile terminals (electronic devices), typically, smartphones include various sensors and are becoming multifunctional. For example, Patent Literature 1 discloses a mobile terminal which includes an authenticating section and a posture detecting section. In a case where authentication of an object by the authenticating section has succeeded, the mobile terminal activates an application which corresponds to a housing posture which has been detected by the posture detecting section.

CITATION LIST

Patent Literature

[Patent Literature 1] Japanese Patent Application Publication, Tokukai, No. 2013-232816 (Publication Date: Nov. 14, 2013)

SUMMARY OF INVENTION

Technical Problem

The mobile terminal disclosed in Patent Literature 1 detects a state in which the mobile terminal is lifted (a posture of the mobile terminal), for example, on the basis of a result of detection by an acceleration sensor. However, the technique disclosed in Patent Literature 1 is not sufficient to prevent a false detection of lifting of the mobile terminal. In view of the above problem, the present invention has been attained. An object of the present invention is to more reliably prevent a false detection of lifting of an electronic device, in an information processing device which is mounted on the electronic device.

Solution to Problem

In order to solve the above problem, an information processing device in accordance with an aspect of the present invention is an information processing device mounted on an electronic device including (a) a proximity sensor for detecting proximity of an object and (b) an acceleration sensor for detecting an acceleration, the information processing device including: a standstill determination section for determining that the electronic device is in a standstill state in a case where a manner of change in the acceleration over time satisfies a predetermined standstill condition; and a lifting determination section for determining whether or not the electronic device has been lifted, the lifting determination section determining that the electronic device has been lifted, in a case where the following conditions (i) and (ii) are satisfied after the manner of the change in the acceleration over time has satisfied a predetermined acceleration condition: (i) the standstill determination section determines that the electronic device is in the standstill state; and (ii) a result of detection by the proximity sensor indicates a transition from proximity to non-proximity within a predetermined time range, the predetermined time range being set with reference to a standstill determination completion time point at which the standstill determination section has completed determination.

Moreover, in order to solve the above problem, an information processing device in accordance with an aspect of the present invention is an information processing device mounted on an electronic device including (a) a proximity sensor for detecting proximity of an object and (b) an acceleration sensor for detecting an acceleration, the information processing device including: an angle calculation section for calculating, on the basis of the acceleration, an angle of a display surface of the electronic device with respect to a horizontal plane; and a lifting determination section for determining whether or not the electronic device has been lifted, the lifting determination section starting a process for determining whether or not the electronic device has been lifted in a case where the following conditions (i) and (ii) are satisfied: (i) the angle is within a predetermined angle range; and (ii) the result of detection by the proximity sensor is indicative of proximity.

Further, in order to solve the above problem, a method in accordance with an aspect of the present invention is a method for controlling an information processing device mounted on an electronic device including a proximity sensor for detecting proximity of an object and (b) an acceleration sensor for detecting an acceleration, the method including: a standstill determination step of determining that the electronic device is in a standstill state in a case where a manner of change in the acceleration over time satisfies a predetermined standstill condition; and a lifting determination step of determining whether or not the electronic device has been lifted, in the lifting determination step, it being determined that the electronic device has been lifted, in a case where the following conditions (i) and (ii) are satisfied after the manner of the change in the acceleration over time has satisfied a predetermined acceleration condition: (i) in the standstill determination step, it is determined that the electronic device is in the standstill state; and (ii) a result of detection by the proximity sensor indicates a transition from proximity to non-proximity within a predetermined time range, the predetermined time range being set with reference to a standstill determination completion time point at which determination has been completed in the standstill determination step.

Advantageous Effects of Invention

An information processing device in accordance with an aspect of the present invention advantageously makes it possible to more reliably prevent a false detection of lifting of an electronic device. Further, a method for controlling an information processing device in accordance with an aspect of the present invention produces a similar effect.

DESCRIPTION OF EMBODIMENTS

Embodiment 1

The following description will discuss details of Embodiment 1 of the present invention, with reference to FIGS. 1 to 9. Embodiment 1 describes below a smartphone as an example of a mobile terminal 1 (electronic device). The electronic device in accordance with an aspect of the present invention is not limited to the example and may be any portable electronic device such as a portable information terminal, a portable television, or a portable personal computer.

(Mobile Terminal 1)

Figure 2:
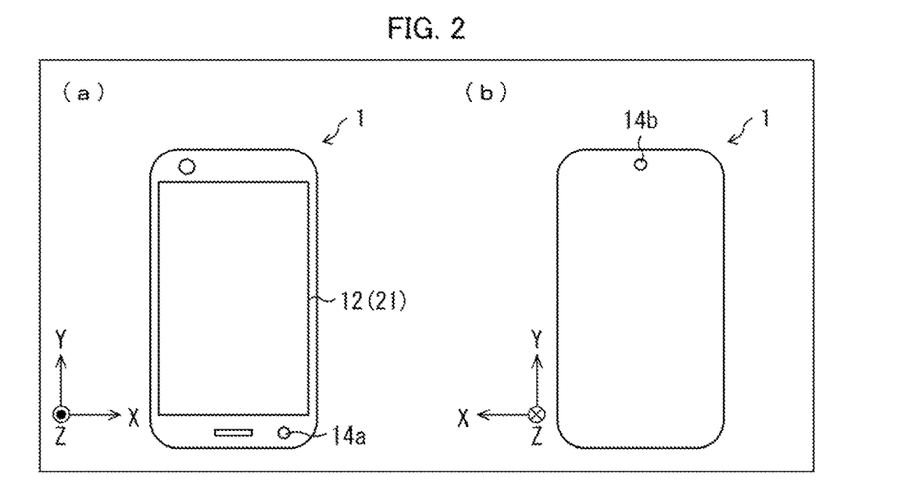
FIG. 2 is a view illustrating an appearance of the mobile terminal. (a) of FIG. 2 is a view illustrating a front side of the mobile terminal, and (b) of FIG. 2 is a view illustrating a back side of the mobile terminal.

FIG. 2 is a view illustrating an appearance of the mobile terminal 1. (a) of FIG. 2 illustrates a front side of the mobile terminal 1, and (b) of FIG. 2 illustrates a back side of the mobile terminal 1. Note that the front side of the mobile terminal 1 means a side where a touch panel 12 (described later) is provided (i.e., a side where a display section 21 (display surface) is provided). Meanwhile, the back side means a side opposite to the display section 21. Note that FIG. 2 shows the mobile terminal 1 in an xyz orthogonal coordinate system (described later). The mobile terminal 1 has a front surface and a back surface which are provided with proximity sensors 14a and 14b, respectively. The proximity sensors 14a and 14b each detect proximity of an object. Hereinafter, the proximity sensors 14a and 14b are collectively called proximity sensors 14. Note that the number of the proximity sensors 14 is not limited to two, and may be one or not less than three. Further, the proximity sensors 14 are not particularly limited in type and position where the proximity sensor 14 is provided in the mobile terminal 1. A result of detection by the proximity sensor 14 is supplied to a control section 10 (information processing device) (described later).

Figure 3:
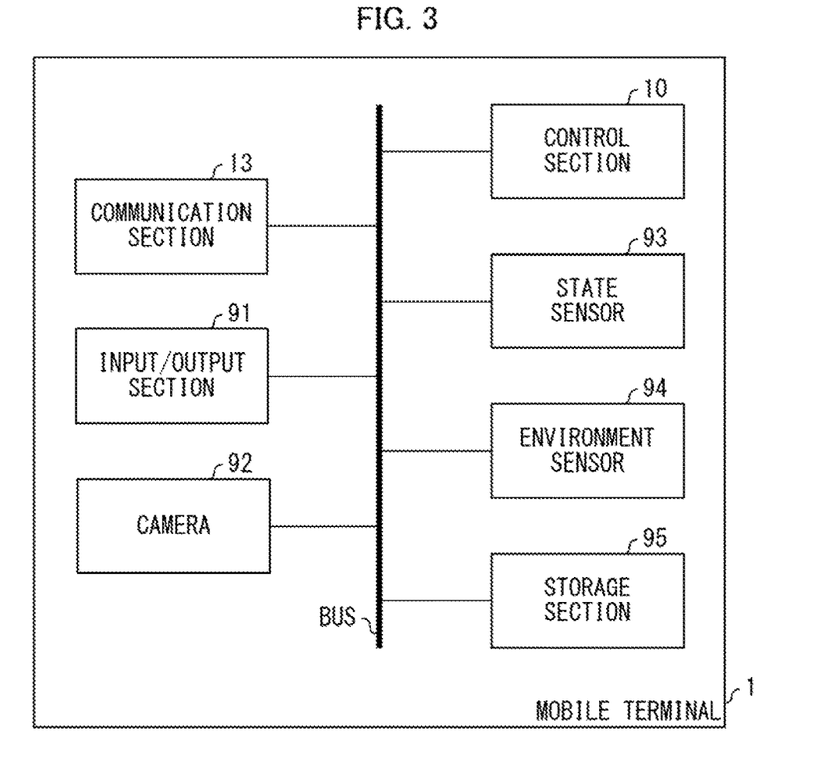
FIG. 3 is a diagram illustrating a hardware configuration of the mobile terminal.

FIG. 3 is a view illustrating a typical hardware configuration of the mobile terminal 1. The mobile terminal 1 includes a control section 10, a communication section 13, an input/output section 91, a camera 92, a state sensor 93, an environment sensor 94, and a storage section 95, which are connected with one another via a system bus. The control section 10 carries out overall control of the above sections of the mobile terminal 1. The function of the control section 10 may be realized by causing a central processing unit (CPU) to execute a program stored in the storage section 95. The storage section 95 stores various programs to be executed by the control section 10 and data to be used by the control section 10 to execute the programs. The communication section 13 is a communication interface which is used when the mobile terminal 1 carries out communication (wired communication or wireless communication) with an external device. The input/output section 91 receives an input operation of a user. At the same time, the input/output section 91 serves as a member for presenting various kinds of information to a user. The input/output section 91 corresponds to the touch panel 12 (described later). The camera 92 captures a moving image in response to a command from the control section 10. The state sensor 93 detects various states of the mobile terminal 1. Examples of the state sensor 93 encompass not only an acceleration sensor 11 described below, but also a gyro sensor, a geomagnetic sensor, an air pressure sensor, and/or the like. The environment sensor 94 detects circumstances around the mobile terminal 1. Examples of the environment sensor 94 encompass an illuminance sensor etc., in addition to the above described proximity sensor 14.

Figure 1:
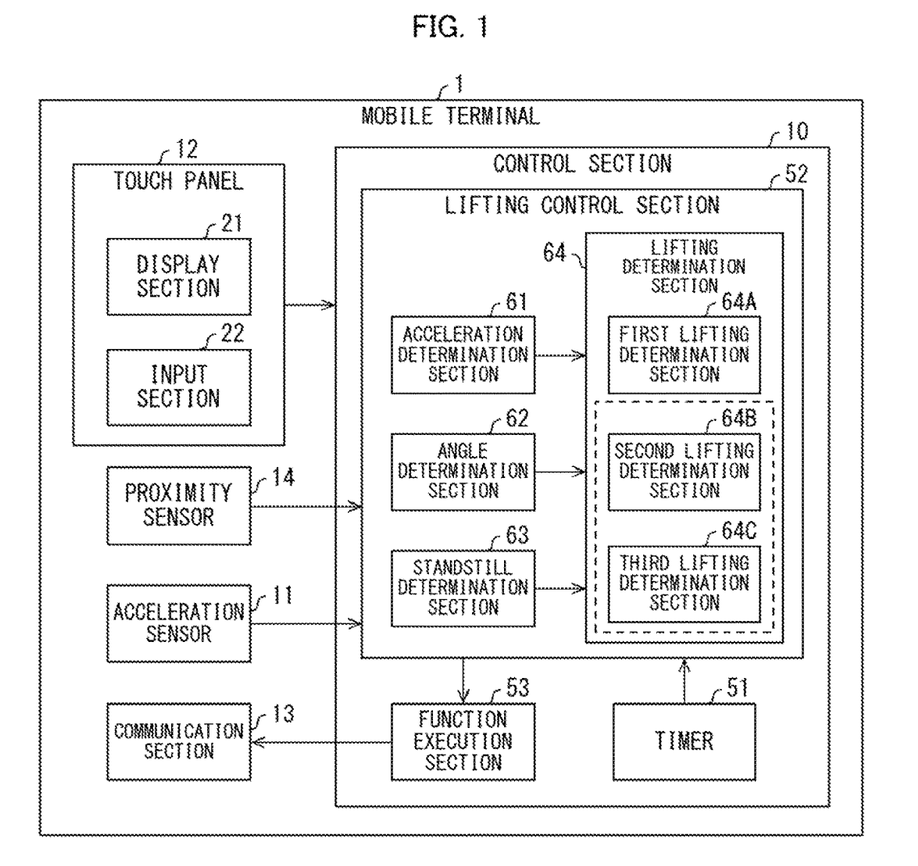
FIG. 1 is a block diagram illustrating a main part configuration of a mobile terminal in accordance with Embodiment 1 of the present invention.

FIG. 1 is a block diagram illustrating a main part configuration of the mobile terminal 1. The mobile terminal 1 includes a control section 10, an acceleration sensor 11, a touch panel 12, a communication section 13 and a proximity sensor 14. The touch panel 12 is a member including the display section 21 and an input section 22, which are superimposed on top of each other and which are integrated with each other. The display section 21 displays various kinds of information (e.g., images), and the input section 22 receives an input operation by detecting a touch of an object (e.g., user's finger). Note that it is possible to add, to the input section 22, a function to detect proximity of an object (hover detecting function).

The acceleration sensor 11 detects accelerations along directions of three axes orthogonal to one another. It is assumed that (i) an X direction (X axis) is along a short-side direction of the display section 21, (ii) a Y direction (Y axis) is along a longitudinal direction of the display section 21, and a Z direction (Z axis) is along a direction from the back side to the front side of the display section 21 (also see FIG. 2 described above). The following provides an explanation using such an xyz orthogonal coordinate system. Hereinafter, respective accelerations in the X direction, the Y direction and the Z direction will be referred to as AX, AY and AZ. Further, the acceleration sensor 11 further detects synthetic acceleration (hereinafter, referred to as V) obtained by synthesizing the respective accelerations AX, AY, and AZ in the X, Y, and Z directions. A result of detection by the acceleration sensor 11 is supplied to the control section 10. Note that the control section 10 can detect a horizontal plane (plane perpendicular to a direction of gravitational force), on the basis of the result of detection by the acceleration sensor 11.

The control section 10 includes a timer 51, a lifting control section 52, and a function execution section 53. The timer 51 measures (counts up) time and an elapsed time and notifies the lifting control section 52 of the time and the elapsed time. The lifting control section 52 determines whether or not the mobile terminal 1 has been lifted. The function execution section 53 executes a corresponding function in a case where the lifting control section 52 detects lifting of the mobile terminal 1. The corresponding function may be any function as long as the corresponding function is a function associated with lifting (e.g., function to turn on display of the display section 21).

Further, the lifting control section 52 includes an acceleration determination section 61, an angle determination section (angle calculation section) 62, a standstill determination section 63, and a lifting determination section 64. Furthermore, the lifting determination section 64 includes a first lifting determination section 64A (lifting determination section), a second lifting determination section 64B, and a third lifting determination section 64C. First, the following will discuss a mode (also referred to as a normal mode or a second mode) in which the second lifting determination section 64B carries out a lifting determination process.

(Example of Lifting Determination Process in Normal Mode)

The acceleration determination section 61 determines whether or not a manner of change in acceleration over time satisfies predetermined acceleration conditions, and supplies a result of this determination to the second lifting determination section 64B. The acceleration conditions are, for example, the following (1) to (3) (see FIG. 4 (described later)). (1) A waveform representing a change in V over time in a predetermined period has a maximum value and a minimum value. (2) V is higher than a threshold Th1 during a predetermined time period T1 including a time point (Ma) at which V is the maximum value. (3) V is lower than a threshold Th2 during a predetermined time period T2 including a time point (Mb) at which V is the minimum value. The above acceleration conditions are set in view of a change in acceleration over time in a case where movement for lifting (lifting motion) of the mobile terminal 1 is made.

The angle determination section 62 calculates an angle of the display section 21 (that is, Y axis) with respect to the horizontal plane, on the basis of the acceleration. For example, after the acceleration conditions have been satisfied, the angle determination section 62 determines whether or not the angle thus calculated is within a predetermined angle range (more specifically, whether or not the manner of change in acceleration over time satisfies a predetermined angle condition). Then, the angle determination section 62 supplies a result of this determination to the second lifting determination section 64B. The predetermined angle range is, for example, an angle range (e.g., not less than 15° and not more than) 68°) including an angle of 45° which the Y axis makes with the horizontal plane. The predetermined angle range may be understood, for example, as a range of the angle of the display section 21 with respect to the horizontal plane in a case where a user lifts the mobile terminal 1 and views the display section 21. A state (posture) of the mobile terminal 1 whose angle is within the predetermined angle range is referred to as "45° state". In contrast, a state (posture) of the mobile terminal 1 whose angle is outside the predetermined angle range is referred to as "non-45' state".

The standstill determination section 63 determines whether or not the mobile terminal 1 is in a standstill state, on the basis of the acceleration (more specifically, whether or not the manner of change in acceleration over time satisfies a predetermined standstill condition). For example, the standstill determination section 63 determines whether or not the mobile terminal 1 is in the standstill state after the above angle condition has been satisfied. Then, the standstill determination section 63 supplies a result of this determination to the second lifting determination section 64B.

Figure 4:
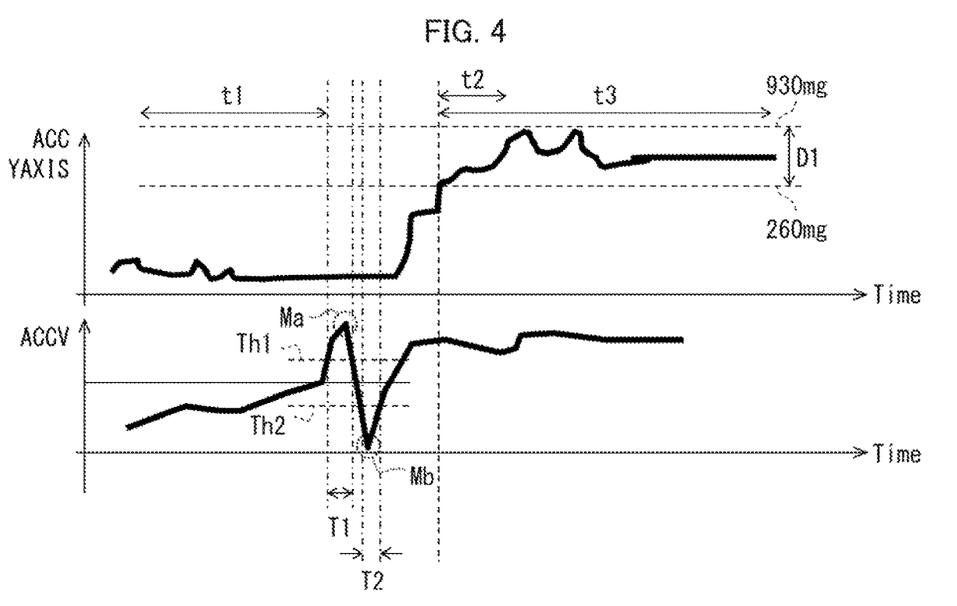
FIG. 4 is a diagram for explaining how to detect lifting in a normal mode.

FIG. 4 is a diagram for explaining how to detect lifting in the normal mode. In each graph of FIG. 4, a horizontal axis represents time, and a vertical axis represents acceleration. More specifically, in an upper graph of FIG. 4, a vertical axis (ACC YAXIS) represents acceleration AY in the Y direction and, in a lower graph of FIG. 4, a vertical axis (ACCV) represents synthetic acceleration V. Note that numerical values below are merely examples, and such numerical values may be changed as appropriate in accordance with a specification of the mobile terminal 1. The following will discuss a specific example of a lifting determination process in the normal mode. Note that similarly in a horizontal mode and a glance mode which will be discussed later, numerical values may be changed as appropriate.

First, the angle determination section 62 determines whether or not the mobile terminal 1 is in the non-45° state. Specifically, the angle determination section 62 determines that the mobile terminal 1 is in the non-45° state, in a case where the accelerations satisfy the following angle conditions (4) and (5) (conditions for determining a non-45° state) for a predetermined time period (t1 in FIG. 4, e.g., 300 ms). Here, represents a gravitational acceleration. (4) AX<−400 mg or AX>400 mg. (5) AY<260 mg or AY>930 mg (that is, AY is outside a range of D1 in FIG. 4). Note that there is no particular condition for AZ.

Next, the acceleration determination section 61 determines that the above acceleration conditions (1) to (3) are satisfied in a case where the following formulae (A) to (C) are satisfied:

$$V(M) \leq 1150 \text{ mg, and } \min(V(M+1), V(M+2)) > 1150 \text{ mg} \quad (A);$$

$$V(N) < 850 \text{ mg, and } \min(V(N+1), V(N+2)) \geq 850 \text{ mg} \quad (B); \text{ and}$$

$$180 \text{ ms} \leq Tb - Ta \leq 1500 \text{ ms} \quad (C).$$

In the above formulae, V(M) represents a synthetic acceleration V at a time point M and V(N) represents a synthetic acceleration V at a time point N, where M and N are each an integer of not less than 0. Further, Ta represents a time point of V(M+2) and Tb represent a time point of V(N+2). Note that (i) M+1 indicates a time point following the time point M (e.g., 50 ms after the time point M), and (ii) M+2 indicates a time point following the time point M+1 (e.g., 50 ms after the time point M+1) (the same applies to N). The formulae (A) and (B) are determination conditions for detecting the maximum value and the minimum value of V, respectively. Further, the formula (C) is a determination condition which is set in view of a manner of change (transition from the maximum value to the minimum V over time.

Next, the angle determination section 62 determines whether or not the mobile terminal 1 is in the 45° state. Specifically, the angle determination section 62 determines that the mobile terminal 1 is in the 45° state, in a case where the accelerations satisfy the following angle conditions (6) to (8) (conditions for determining a 45° state) for a predetermined time period (e.g., 210 ms=30 ms×7): (6)−400 mg≤AX≤400 mg; (7) 260 mg≤AY≤930 mg (that is, AY is within the range of D1 in FIG. 4); and (8) AZ>0 (where a positive direction of the Z axis corresponds to a direction from the back side to the front side of the mobile terminal 1).

Note that the condition (6) corresponds to a state in which an angle of the X axis with respect to the horizontal plane is within ±25' (or the above condition (4) corresponds to a state in which an angle of the X axis with respect to the horizontal plane is not within ±25°). Note also that the condition (7) corresponds to a state in which an angle of the Y axis with respect to the horizontal plane is within the predetermined angle range (not less than 15° and not more than 68°(or the above condition (5) corresponds to a state in which an angle of the Y axis with respect to the horizontal plane is not within the predetermined range). Further, whether the conditions (6) to (8) are satisfied is determined a plurality of times (e.g., 7 times) at predetermined intervals (e.g., every 30 ms). Then, when the conditions (6) to (8) are satisfied in all the plurality of times of determination, it is determined that the mobile terminal 1 is in the 45° state.

Next, the standstill determination section 63 determines that the mobile terminal 1 is in the standstill state in a case where the accelerations satisfy the following standstill condition (9): (9) With regard to values of each of the respective accelerations in the X direction, the Y direction and the Z direction, which accelerations are successively obtained by the acceleration sensor 11 for 210 ms at intervals of 30 ms and then supplied from the acceleration sensor 11, a dispersion of the values which exclude a maximum value and a minimum value is within 40 mg. In this way, the standstill determination section 63 determines that the mobile terminal 1 is in the standstill state for a predetermined time period (e.g., 210 ms=30 ms×7).

The standstill determination section 63 may start standstill determination for the mobile terminal 1, after passage of a predetermined time (t2 in FIG. 4, e.g., 120 ms) from a time point at which it was determined that the above-described conditions for determining a 45° state are satisfied. This makes it possible to carry out the standstill determination for a time period which excludes a period in which the state (posture) of the mobile terminal 1 is unstable. Further, the standstill determination section 63 ends the standstill determination (a process of the standstill determination times out), in a case where the dispersion is more than 40 mg even after passage of a predetermined time (t3 in FIG. 4, e.g., 3.3 s) from a time point at which the standstill determination started.

Then, when the "conditions for determining a non-45° state", the "acceleration conditions", the "conditions for determining a 45° state" and the "standstill condition" are satisfied in this order, the second lifting determination section 64B determines that the mobile terminal 1 has been lifted (lifting of the mobile terminal 1 is detected). Note however that the second lifting determination section 64B may be configured to determine that the mobile terminal 1 has been lifted, in a case where not all but at least one of the following conditions (a) to (c) is satisfied: (a) the acceleration conditions, (b) the angle conditions (the conditions for determining a non-45° state and the conditions for determining a 45' state), and (c) the standstill condition (e.g., in a case where only the acceleration conditions are satisfied). In regard to this point, the same applies to the first lifting determination section 64A and the third lifting determination section 64C, which will be described later. Note that the lifting control section 52 may carry out a next lifting determination process, after passage of a predetermined time from an immediately preceding lifting determination process.

Figure 5:
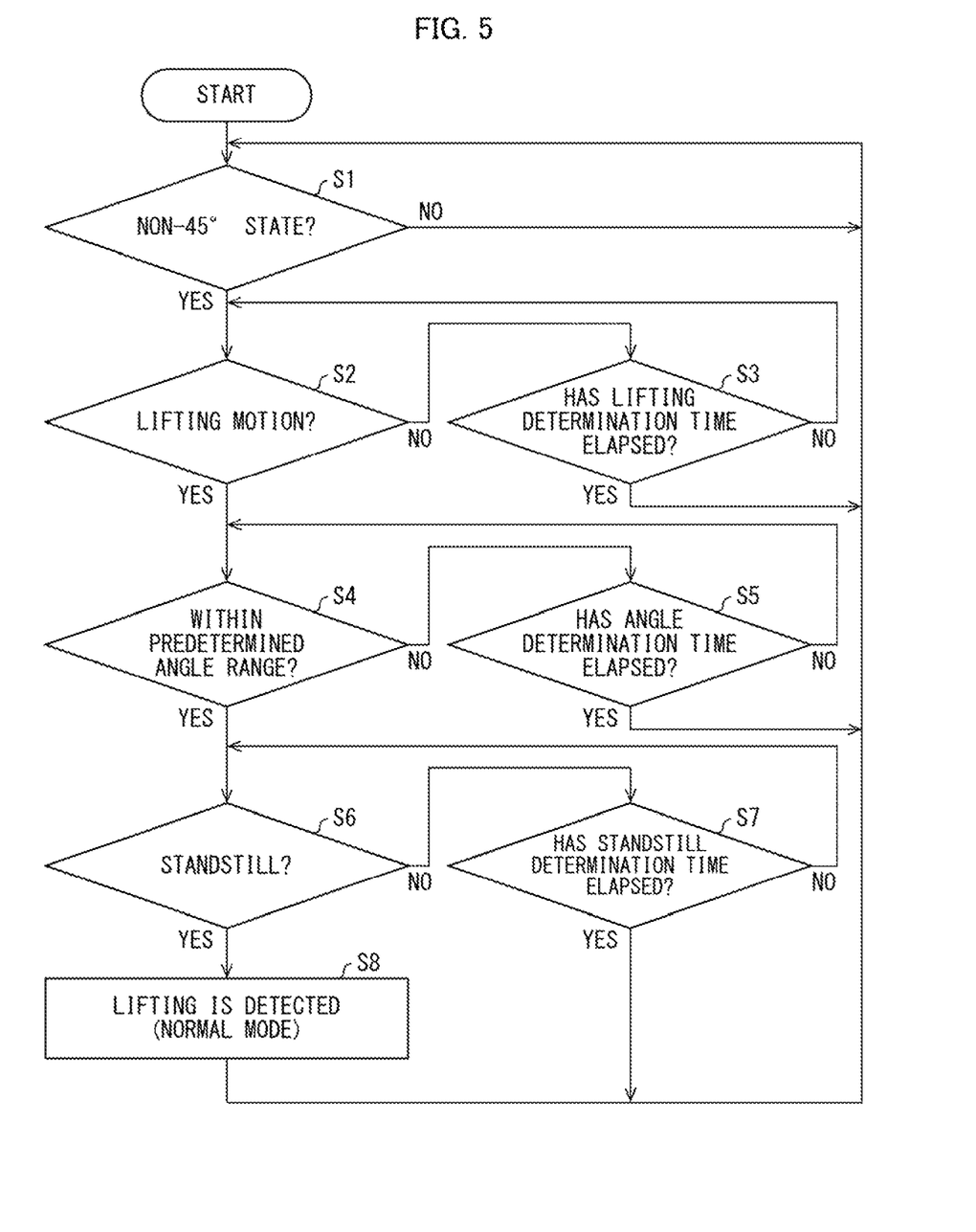
FIG. 5 is a chart illustrating a flow of a lifting detection process in the normal mode.

FIG. 5 is a flowchart illustrating a flow of a lifting detection process (steps S1 to S8) in the normal mode. The following will briefly discuss the flow of that process, with reference to FIG. 5. First, the angle determination section 62 determines whether or not the conditions for determining a non-45° state are satisfied (S1). In a case where the conditions for determining a non-45° state are satisfied (YES in S1), the acceleration determination section 61 determines whether or not the acceleration conditions are satisfied (determination on a lifting motion) (S2). Then, in a case where the acceleration conditions are satisfied (YES in S2), the angle determination section 62 determines whether or not the conditions for determining a 45° state (S4) are satisfied. In a case where the conditions for determining a 45° state are satisfied (YES in S4), the standstill determination section 63 determines whether or not the standstill condition is satisfied (S6). In a case where the standstill condition is satisfied, the second lifting determination section 64B detects lifting of the mobile terminal 1 (S8).

In contrast, in a case where the conditions for determining a non-45' state are not satisfied in S1 (NO in S1), the process goes back to S1. Meanwhile, in a case where the acceleration conditions are not satisfied in S2 (NO in S2) and a predetermined time (lifting determination time) has elapsed (YES in S3), the process goes back to S1. In a case where the conditions for determining a 45° state are not satisfied in S4 (NO in S4) and a predetermined time (angle determination time) has elapsed (YES in S5), the process goes back to S1. In a case where the standstill condition is not satisfied in S1 (NO in S6) and a predetermined time (standstill determination time) has elapsed (YES in S7), the process goes back to S1.

(Example of Lifting Determination Process in Horizontal Mode)

Note that the lifting determination process may be carried out by the third lifting determination section 64C in place of the second lifting determination section 64B. The following will discuss a mode (also referred to as a horizontal mode or a third mode) in which the third lifting determination section 64C carries out a lifting determination process. In the horizontal mode, the third lifting determination section 64C starts lifting determination in a case where an initial state of the mobile terminal 1 is a horizontal state. As described below, in the horizontal mode unlike in the above-described normal mode, lifting of the mobile terminal 1 can be detected without determining whether or not the acceleration conditions are satisfied.

Figure 6:
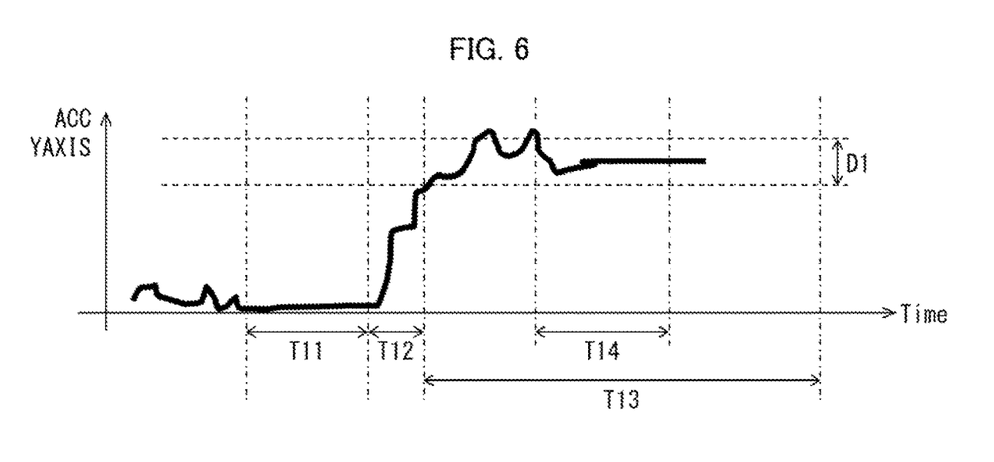
FIG. 6 is a diagram for explaining how to detect lifting in a horizontal mode.

FIG. 6 is a diagram for explaining how to detect lifting in the horizontal mode. In the graph of FIG. 6, a horizontal axis represents time, and a vertical axis represents acceleration AY in the Y direction. In the horizontal mode, the angle determination section 62 determines, on the basis of the acceleration, that the mobile terminal 1 is in a horizontal state. Specifically, the angle determination section 62 determines that the mobile terminal 1 is in the horizontal state, in a case where −100 mg≤AY≤100 mg for a predetermined time period T11 (e.g., 2 s) (in other words, the angle of the Y axis with respect to the horizontal plane is within a range of ±6°).

Next, in a case where (i) AX or AY is not less than 20 mg and (ii) AZ is not less than 30 mg for a predetermined time period T12 (e.g., 2 s), the acceleration determination section 61 determines that there has been a motion which causes a state change of the mobile terminal 1 from the horizontal state. This determination may be carried out a predetermined number of times (e.g., two times). The predetermined number of times (plurality of times) of the determination makes it possible to remove oscillation noise. Note that in a case where the above conditions are not satisfied for the predetermined time period T12, a process of determination on the motion times out in the acceleration determination section 61. Further, as in the normal mode described above, the angle determination section 62 determines whether or not the conditions for determining a 45° state are satisfied and the standstill determination section 63 determines whether or not the standstill condition is satisfied. Note that in FIG. 6, a period T13 indicates a time-out period (e.g., 2 s) in a case where the standstill determination section 63 carries out the standstill determination, and a period T14 indicates a period in which the standstill determination section 63 carries out the standstill determination.

Figure 7:
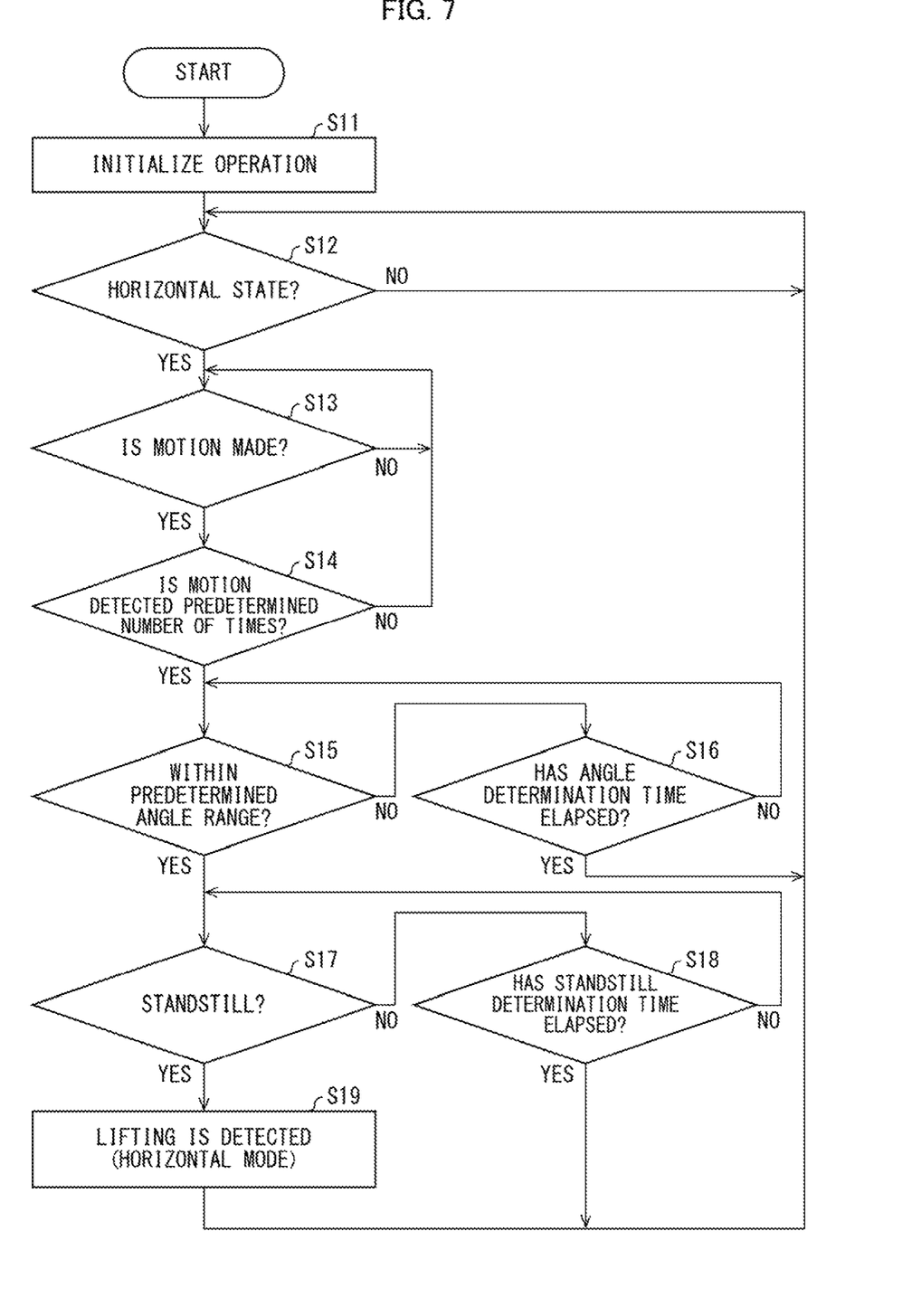
FIG. 7 is a chart illustrating a flow of a lifting detection process in the horizontal mode.

FIG. 7 is a flowchart illustrating a flow of a lifting detection process (steps S11 to S19) in the horizontal mode. The following will briefly discuss the flow of that process, with reference to FIG. 7. Note that processing in S15 to S18 is similar to that in S4 to S7 above, and therefore explanations thereof will be omitted here. In the horizontal mode, first, the control section 10 initializes an operation (S11). This initialization is a process for calculating a reference acceleration at the start of operation. For example, the initialization is carried out by obtaining an acceleration in each direction 40 times at intervals of 50 ms. Next, the angle determination section 62 determines whether or not the mobile terminal 1 is in the horizontal state (S12). In a case where the mobile terminal 1 is not in the horizontal state (NO in S12), the process goes back to S12.

In contrast, in a case where the mobile terminal 1 is in the horizontal state (YES in S12), the acceleration determination section 61 determines whether or not the above motion is made (S13). Then, in a case where the above motion is made (YES in S13), the acceleration determination section 61 determines whether or not a determination condition concerning the motion is satisfied successively in a predetermined number of times of determination (S14). In a case where the determination condition concerning the motion is satisfied successively in the predetermined number of times of determination (YES in S14), the process proceeds to S15. Note that each determination condition in the horizontal mode may be less severely set than that in the normal mode. Then, in a case where the standstill condition is satisfied in S17 (YES in S17), the third lifting determination section 64C detects lifting of the mobile terminal 1 (S19).

(Example of Lifting Determination Process in Glance Mode)

Note that the lifting determination process may be carried out by the first lifting determination section 64A in place of the second lifting determination section 64B and the third lifting determination section 64C. The following will discuss a mode (also referred to as a glance mode or a first mode) in which the first lifting determination section 64A carries out a lifting determination process. As described below, in the glance mode, a result of detection by the proximity sensor 14 (hereinafter, referred to as proximity detection result) is further used for lifting determination. At least in this regard, the glance mode is significantly different from the normal mode and the horizontal mode which are described above.

Here, suppose, as an example, a state in which the mobile terminal 1 is held in a chest pocket of a user. It is considered that in this state, the user may move to lift the mobile terminal 1 in order to view (glance at) an image displayed in the display section 21 while the user is in a posture leaning to some degree (a forward-leaning or backward-leaning posture, or a posture at which the mobile terminal 1 is in the 45° state). In Embodiment 1, the glance mode is provided as a mode for carrying out a more preferable process for detection of lifting of the mobile terminal 1 in the case of such glancing.

Figure 8:
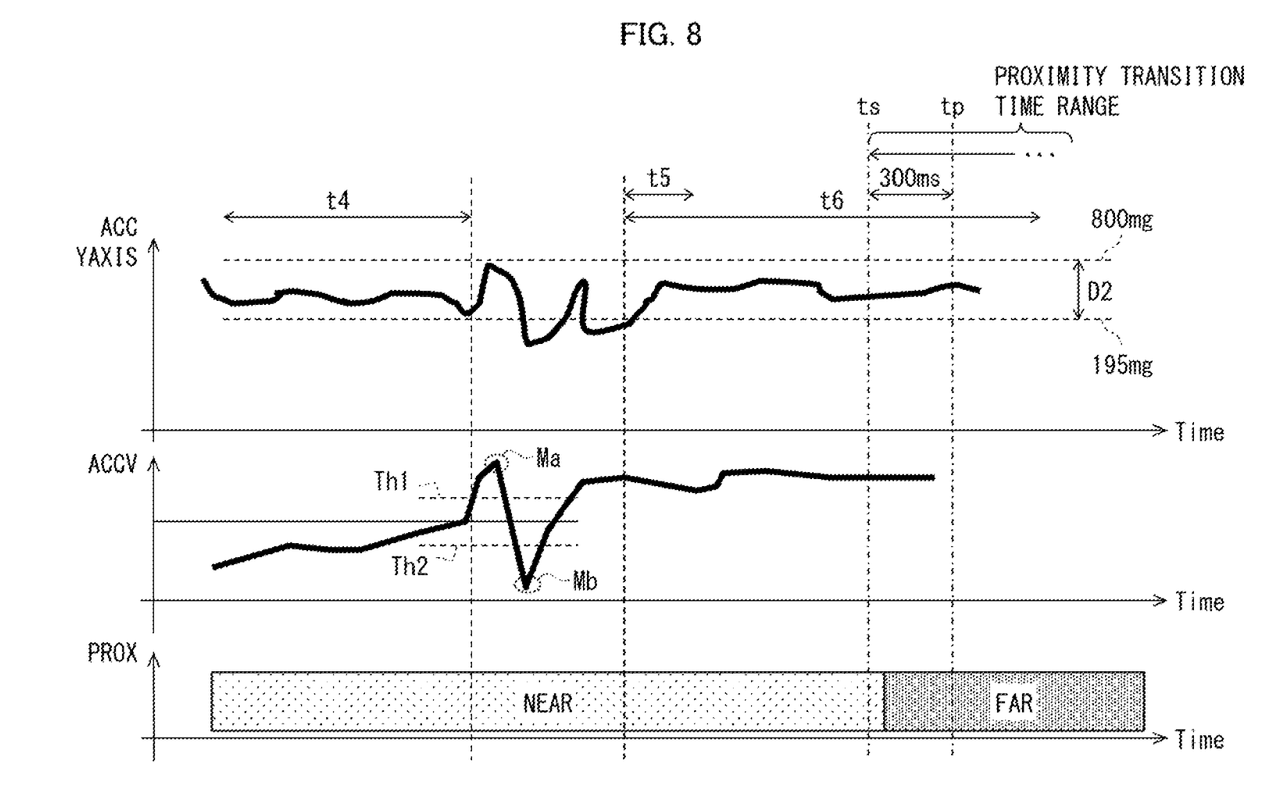
FIG. 8 is a diagram for explaining how to detect lifting in a glance mode.

FIG. 8 is a diagram for explaining how to detect lifting in the glance mode. In each graph of FIG. 8, a horizontal axis represents time. Further, a vertical axis in an upper graph of FIG. 8 represents acceleration AY in the Y direction and a vertical axis in a middle graph of FIG. 8 represents synthetic acceleration V. A lower graph of FIG. 8 is a time chart. In this lower graph, a vertical axis (PROX) shows the above-described proximity detection result. In the time chart, the proximity detection result is expressed as "NEAR" in the case of a state (proximity) where an object is in proximity, whereas the proximity detection result is expressed as "FAR" in the case of a state (non-proximity) where an object is not in proximity.

In the glance mode, the angle determination section 62 first determines whether or not the mobile terminal 1 is in the 45° state. Note that in the conditions for determining a 45° state in the glance mode, an AY determination condition may be set so as to be different from that (the condition (7) described above) in the normal mode. Note however that the AY determination condition in the glance mode may be the same as that in the normal mode. Further, AX and AZ determination conditions in the glance mode may be the same as those (the conditions (6) and (8) above) in the normal mode. Note that a time period for which the angle determination section 62 carries out determination of the 45° state is, for example, 10 s (t4 in FIG. 8).

An example of the AY determination condition in the conditions for determining a 45° state is the following (10) in the glance mode. (10) 195 mg≤AY≤800 mg (that is, AY is within a range of D2 in FIG. 8). In this way, in the conditions for determining a 45° state in the glance mode, an upper limit of AY is lower than that in the normal mode (and a lower limit of AY is lower than that in the horizontal mode). Note that the above-described D2 (and D1) is set in advance in the mobile terminal 1. Further, FIG. 8 shows, as an example, a case where in a period of time a little after the time period t4, AY is temporarily lower than the lower limit of D2 (outside the range of D2). However, in the glance mode, AY may be always within the range of D2.

In general, a range of lifting of the mobile terminal 1 for glancing is narrower (a displacement of the mobile terminal 1 by lifting of the mobile terminal 1 is smaller) than that in cases other than lifting for glancing. Accordingly, a change in AY in glancing is relatively smaller. On this account, in regard to the conditions for determining a 45° state in the glance mode, the upper limit and/or the lower limit of D2 is/are set lower than that/those of D1 in the case of the normal mode. This makes it possible to more reliably detect a lifting motion for glancing (a lifting motion in a narrower range of lifting which starts from a pre-glance state (which will be described below)).

Prior to lifting of the mobile terminal 1 for glancing, the mobile terminal 1 is in the 45° state and held in the chest pocket. In other words, the mobile terminal 1 is in proximity to the chest pocket, so that the proximity detection result is NEAR. Hereinafter, a state in which (i) the mobile terminal 1 is in the 45° state and (ii) the proximity detection result is NEAR is referred to as "pre-glance state".

In view of the above, in the glance mode, the first lifting determination section 64A may start lifting determination only in a case where the mobile terminal 1 is in the pre-glance state. It is possible to more reliably detect lifting of the mobile terminal 1 for glancing, by carrying out lifting determination in the glance mode only in a case where the mobile terminal 1 is in the pre-glance state. Note that in a case where the mobile terminal 1 is not in the pre-glance state, lifting determination may be carried out in a mode (e.g., the normal mode) that is not the glance mode. When the proximity detection result is further taken into consideration as described above, a false detection of lifting of the mobile terminal 1 can be more reliably prevented.

Next, the acceleration determination section 61 determines whether or not the acceleration conditions are satisfied as in the above normal mode. However, in the glance mode, since the acceleration AY in the Y direction is lower, the synthetic acceleration V is also relatively lower. In light of this, in the glance mode, the formula (A) in the above-described normal mode may be replaced by the following formula (A1):

$$V(M) \leq 950 \text{ mg, and } \min(V(M+1), V(M+2)) > 950 \text{ mg} \quad (A1)$$

In this way, in the acceleration conditions in the glance mode, an upper limit of V in the determination condition for the maximum value may be set lower than that in the normal mode. Note however that the above formula (A) may also be used. Further, the above formulae (B) and (C) may be used in the glance mode.

Next, as in the normal mode described above, the standstill determination section 63 determines whether or not the mobile terminal 1 is in the standstill state. Hereinafter, a time point at which the standstill determination section 63 determines that the mobile terminal 1 is in the standstill state is referred to as a standstill determination completion time point (tp in FIG. 8). Note that in the glance mode, the determination condition of the dispersion in the Z direction may be set to, for example, not more than 30 mg. In this way, in the glance mode, the determination condition on the dispersion in the Z direction may be set to be severer than that in the normal mode. Note that t5 and t6 in FIG. 8 are time periods corresponding to t2 and t3 in FIG. 4, respectively. For example, t5 is 120 ms and t6 is 2 s.

After the mobile terminal 1 has been lifted for glancing, the mobile terminal 1 is no longer held in the chest pocket. Therefore, the mobile terminal 1 is not in proximity to the chest pocket. Accordingly, the proximity detection result becomes FAR. In light of this, in the glance mode, the first lifting determination section 64A may detect lifting of the mobile terminal 1 in a case where (i) the standstill determination section 63 determines that the mobile terminal 1 is in the standstill state and (ii) the proximity detection result indicates a transition from NEAR to FAR within a predetermined time range (hereinafter, referred to as proximity transition time range) which is set with reference to tp. Note that the above conditions (i) and (ii) are collectively referred to as a standstill/proximity transition condition. In further consideration of a change in proximity of the mobile terminal 1 as described above, lifting of the mobile terminal 1 for glancing can be more reliably detected as compared with the normal mode and the horizontal mode which are described above.

Note that in lifting of the mobile terminal 1 for glancing, the proximity detection result often indicates the transition from NEAR to FAR at a time point prior to tp. In light of this, a time point (ts in FIG. 8) from which the proximity transition time range starts may be set at a time point prior to tp. This setting makes it possible to determine, before completion of the standstill determination, whether the proximity detection result indicates the transition, and therefore, makes it possible to shorten a time period needed for detection of lifting for glancing. As a result, a response to a user operation can be made at the right time. For example, ts may be set at a point 300 ms prior to tp, that is, ts may be set such that "ts=tp−300 ms". Note that it is not necessary to set an end point of the proximity transition time range. For example, the proximity transition time range may be set to an entire time range after ts. Note that time-course data of the proximity detection result may be recorded in, for example, the storage section 95. With reference to this time-course data, it is possible to check whether the proximity detection result indicates the transition at a time point (past time point) prior to tp.

Figure 9:
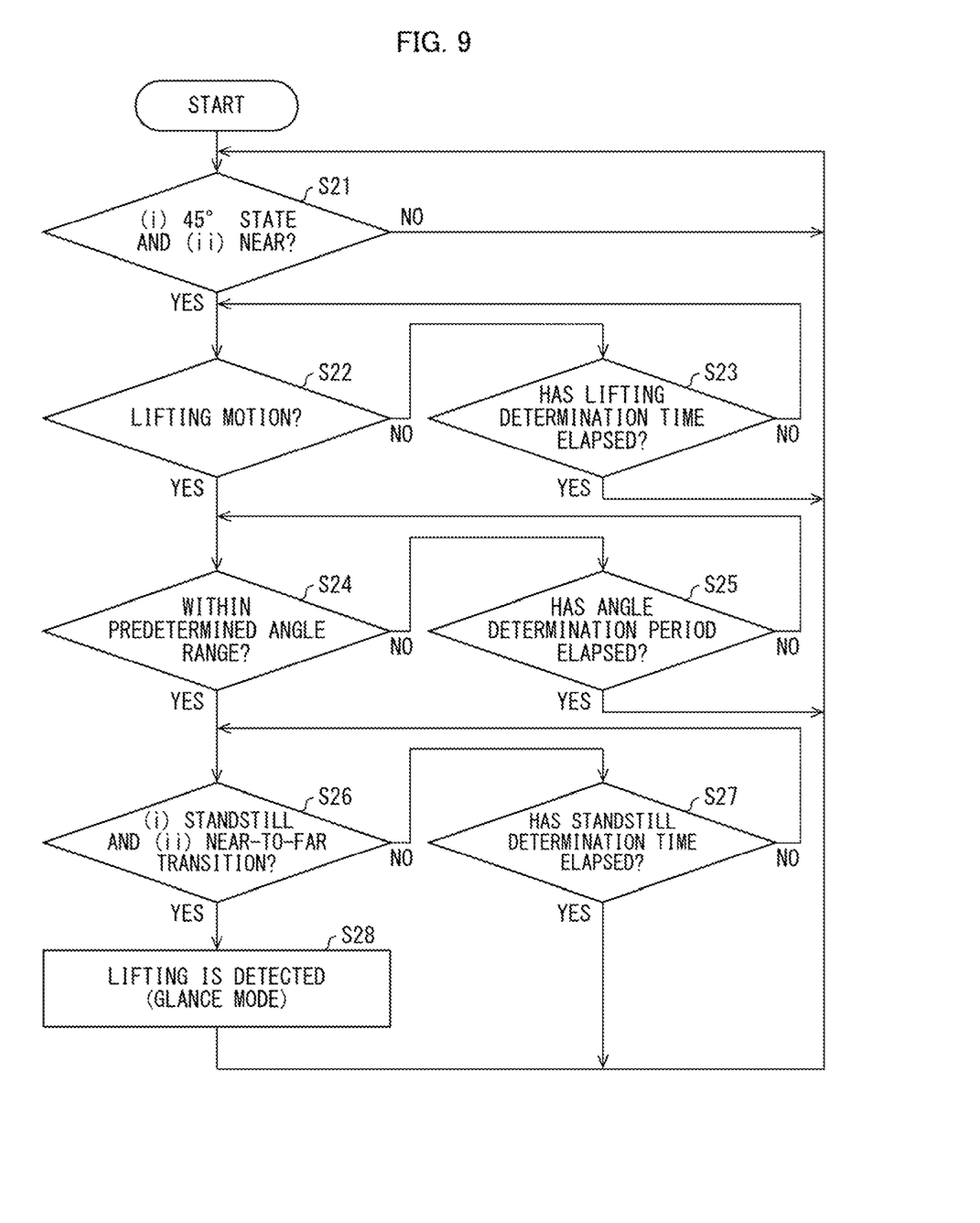
FIG. 9 is a chart illustrating a flow of a lifting detection process in the glance mode.

FIG. 9 is a flowchart illustrating a flow of a lifting detection process (steps S21 to S28) in the glance mode. The following will briefly discuss the flow of that process, with reference to FIG. 9. Note that processing in S22 to S25 and S27 is similar to that in S2 to S5 and S7 above, and therefore explanations thereof will be omitted here. First, the first lifting determination section 64A determines whether or not the mobile terminal 1 is in the above-described pre-glance state (that is, whether or not (i) the mobile terminal 1 is in the 45° state and (ii) the proximity detection result is NEAR) (S21). In a case where the mobile terminal 1 is not in the pre-glance state (NC) in S21), the process returns to S21. In contrast, in a case where the mobile terminal 1 is in the pre-glance state (YES in S21), the process proceeds to S22.

Then, in S26, the first lifting determination section 64A determines whether or not the above standstill/proximity transition condition is satisfied (that is, whether or not (i) the mobile terminal 1 is in the standstill state and (ii) the proximity detection result indicates the transition from NEAR to FAR within the proximity transition time range) (S26, standstill determination step and lifting determination step). Then, in a case where the standstill/proximity transition condition is satisfied (YES in S26), the first lifting determination section 64A detects lifting of the mobile terminal 1 (S28). In contrast, in a case where the standstill/ proximity transition condition is not satisfied (NO in S26), the process proceeds to S27.

As described above, since the glance mode is further provided in the mobile terminal 1, it is possible to favorably detect lifting of the mobile terminal 1 for glancing. This makes it possible to more reliably prevent a false detection of lifting of the mobile terminal 1. Embodiment 1 discussed an example case in which the mobile terminal 1 held in a chest pocket is lifted. However, an aspect in which the mobile terminal 1 is lifted for glancing is not limited to the above example case, and may be any aspect in which the mobile terminal 1 in a pre-glance state is lifted and after this lifting of the mobile terminal 1, the proximity detection result indicates a transition from NEAR to FAR. Examples of such lifting for glancing encompass lifting of the mobile terminal 1 from a state in which the mobile terminal 1 is placed on a recharging stand whose surface is inclined with respect to the horizontal plane or lifting from a state in which the mobile terminal 1 is kept in a pocket of a bag.

Embodiment 2

Figure 10:
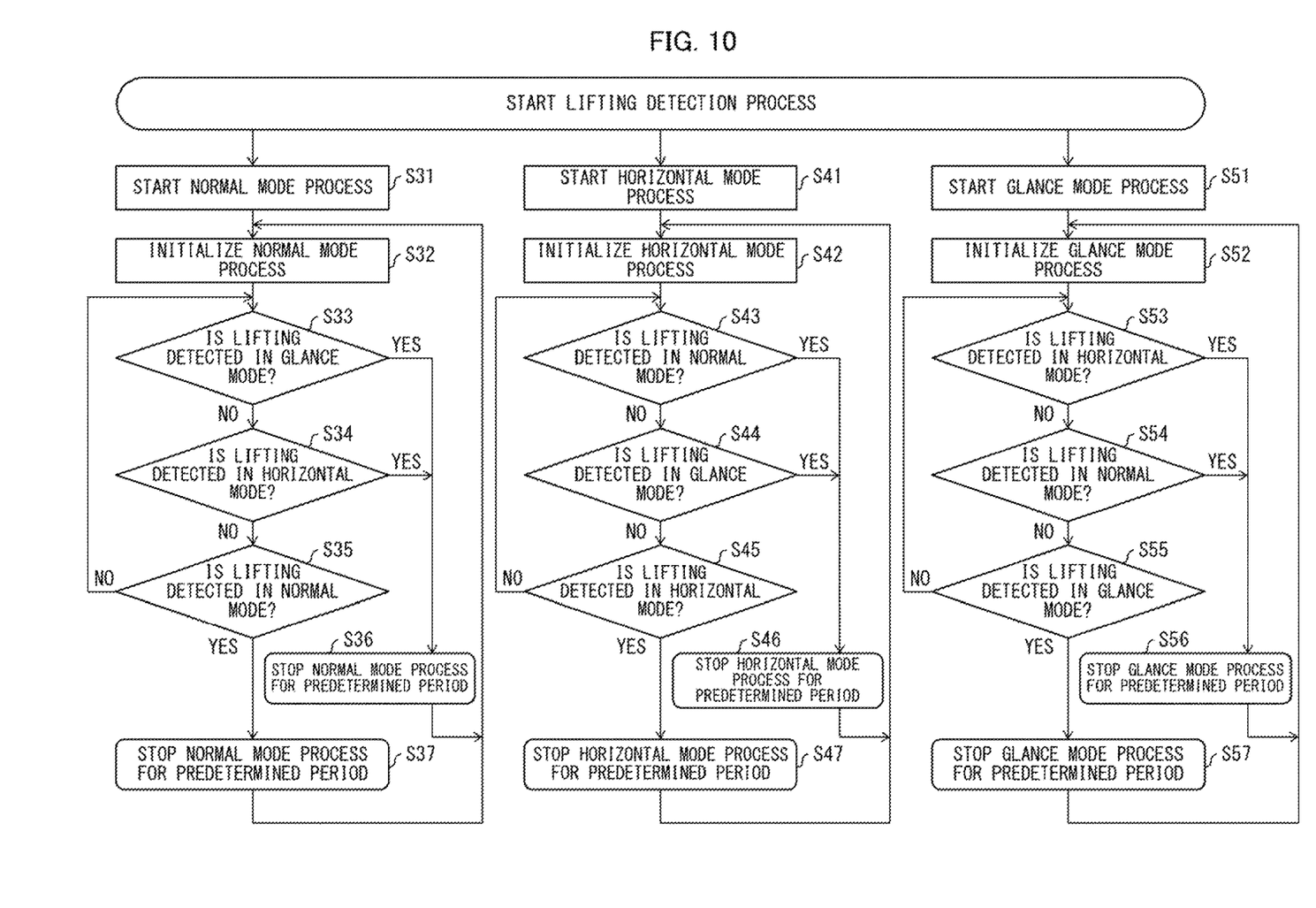
FIG. 10 is a chart illustrating a flow of a process in Embodiment 2 of the present invention.

The following will discuss Embodiment 2 of the present invention, with reference to FIG. 10. Note that, for convenience of explanation, identical reference numerals are given to members which have respective functions identical with those described in Embodiment 1, and descriptions of the respective members are omitted. A mobile terminal 1 may carry out parallel processing of (i) a lifting determination process (glance mode process) by a first lifting determination section 64A, (ii) a lifting determination process (normal mode process) by a second lifting determination section 64B, and a lifting determination process (horizontal mode process) by a third lifting determination section 64C. In Embodiment 2, the following will discuss an example of the parallel processing.

Note that as described above, the second lifting determination section 64B and the third lifting determination section 64C each detect lifting of the mobile terminal 1 without reference to a proximity detection result. In view of this, in distinction from the first lifting determination section 64A (lifting determination section which uses the proximity detection result), the second lifting determination section 64B and the third lifting determination section 64C (lifting determination sections which do not use the proximity detection result) may be collectively called a "second lifting determination section". As described below, in the process of Embodiment 2, in a case where either one of the first lifting determination section and the second lifting determination section carries out the lifting determination process for one lifting motion, the lifting determination process by the other lifting determination section with regard to that one lifting motion is initialized.

FIG. 10 is a flowchart illustrating a flow of a process (steps S31 to S57) in a case where the lifting determination processes in the normal mode, the horizontal mode and the glance mode are carried out in parallel. The following will briefly describe a flow of the process, with reference to FIG. 10. First, the following will discuss the normal mode process with reference to S31 to S37. When the normal mode process is started first (S31), the normal mode process is initialized (S32). Then, in a case where (i) lifting is detected in the glance mode process (YES in S33) or (ii) lifting is detected in the horizontal mode process (YES in S34), the normal mode process is stopped for a predetermined period (e.g., 2 s) (S26) and the process goes back to S32. In contrast, in a case where (i) lifting is not detected in the glance mode process (NO in S33) and (ii) lifting is not detected in the horizontal mode process (NO in S34), lifting is detected in the normal mode process (S35, YES). Then, after the normal mode process is stopped for a predetermined period (S37), the process goes back to S32.

Note that S41 to S47 show a flow of the horizontal mode process and S51 to S57 show a flow of the glance mode process. The flows of these processes are similar to the process of S31 to S37 described above, and therefore explanations thereof will be omitted here. As described above, S31 to S57 make it possible to carry out processes in a plurality of modes (a normal mode process, a horizontal mode process, and a glance mode process) in parallel. In addition, with respect to one lifting motion, in a case where the lifting determination process is carried out in one mode (e.g., the glance mode), the lifting determination processes carried out in the other modes (e.g., the normal mode and the horizontal mode) are initialized. This makes it possible to prevent the lifting determination processes in the other modes from being carried out. Further, a malfunction (a false detection) can be prevented in each mode by stopping the process in that mode for a predetermined period before initialization.

Embodiment 3

In a case where a touch panel 12 has a function to detect proximity of an object (hover detecting function), the touch panel 12 may replace a proximity sensor 14 and be used as a member for detecting proximity of an object. When the touch panel 12 is caused to function as the proximity sensor 14, the proximity sensor 14 can be omitted. This makes it possible to reduce the number of members of the mobile terminal 1.

Further, in a case where the mobile terminal 1 includes a plurality of proximity sensors 14, a result of detection by one (or some) of the proximity sensors 14 can be ignored depending on a state (posture) of the mobile terminal 1. In other words, when the mobile terminal 1 is in a specific posture, it is possible to (i) ignore a result(s) of detection by a proximity sensor(s) which is/are more likely to make a false detection and (ii) use only a result(s) of detection by the other proximity sensor(s) for the carrying out above processes. The following will explain an example case using proximity sensors 14a and 14b in FIG. 2 above. Note that the control section 10 can detect, on the basis of accelerations, whether a display section 21 is facing upward or downward (in a positive or negative direction of a Z direction). For example, in a case where the display section 21 is facing upward, the control section 10 may ignore a result of detection by the proximity sensor 14a (proximity sensor on a front side of the mobile terminal 1) and use only a result of detection by the proximity sensor 14b (proximity sensor on a back side of the mobile terminal 1). In contrast, in a case where the display section 21 is facing downward, the control section 10 may ignore a result of detection by the proximity sensor 14b and use only a result of detection by the proximity sensor 14a. Note however that how to designate (select) a proximity sensor(s) whose detection result(s) is/are ignored is not limited to the above. Further, instead of ignoring a result(s) of detection by a proximity sensor(s), it is possible to stop an operation(s) of the proximity sensor(s). This can reduce a power consumption of the proximity sensor(s), and can consequently provide a lower-power mobile terminal 1.

[Software Implementation Example]

Control blocks of the mobile terminal 1 (particularly, the control section 10) may be realized by a logic circuit (hardware) provided in an integrated circuit (IC chip) or the like or may be realized by software as executed by a CPU (Central Processing Unit). In the latter case, the mobile terminal 1 includes: a CPU that executes instructions of a program that is software realizing the foregoing functions; a Read Only Memory (ROM) or a storage device (each referred to as "storage medium") storing the program and various kinds of data in such a form that they are readable by a computer (or a CPU); and a Random Access Memory (RAM) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be supplied to or made available to the computer via any transmission medium (such as a communication network and a broadcast wave) which enables transmission of the program. Note that the present invention can also be implemented by the program in the form of a computer data signal embedded in a carrier wave which is embodied by electronic transmission.

[Recap]

An information processing device (control section 10) in accordance with Aspect 1 of the present invention is an information processing device mounted on an electronic device (mobile terminal 1) including (a) a proximity sensor (14) for detecting proximity of an object and (b) an acceleration sensor (11) for detecting an acceleration, the information processing device including: a stands till determination section (63) for determining that the electronic device is in a standstill state in a case where a manner of change in the acceleration over time satisfies a predetermined standstill condition; and a lifting determination section (first lifting determination section 64A) for determining whether or not the electronic device has been lifted, the lifting determination section determining that the electronic device has been lifted, in a case where the following conditions (i) and (ii) are satisfied after the manner of the change in the acceleration over time has satisfied a predetermined acceleration condition: (i) the standstill determination section determines that the electronic device is in the standstill state; and (ii) a result of detection by the proximity sensor indicates a transition from proximity to non-proximity within a predetermined time range, the predetermined time range being set with reference to a standstill determination completion time point (tp) at which the standstill determination section has completed determination.

As described above, assume a case where, while an electronic device is held in a chest pocket of a user, the user moves to lift the electronic device so that the user can glance at an image which is displayed on a display surface of the electronic device. In this case, when the user moves to lift the electronic device, the user is in a posture leaning to some degree. Before the user lifts the electronic device for glancing, the electronic device is held in the chest pocket. Therefore, the electronic device is in proximity to the chest pocket (proximity, NEAR). In contrast, after the user has lifted the electronic device for glancing, the electronic device is no longer held in the chest pocket. Therefore, the electronic device is not in proximity to the chest pocket (non-proximity, FAR). In the above configuration, in a case where a result (proximity detection result) of detection by the proximity sensor indicates a transition from NEAR to FAR within a predetermined time range (the above-described proximity transition time range) which is set with reference to a standstill determination completion time point, it is determined that the electronic device has been lifted. In other words, lifting of the electronic device can be detected in the glance mode. When a change from the proximity of the electronic device is further taken into consideration as described above, lifting of the electronic device for glancing can be more reliably detected. This accordingly makes it possible to more reliably prevent a false detection of lifting of the mobile terminal.

An information processing device in accordance with Aspect 2 of the present invention is preferably configured such that in the above Aspect 1, a time point (ts) from which the predetermined time range starts is preceding the standstill determination completion time point. The above configuration makes it possible to determine, before completion of the standstill determination, whether the proximity detection result indicates the transition. This can shorten a time period needed for detection of lifting for glancing. As a result, a response to a user operation can be made at the right time.

An information processing device in accordance with Aspect 3 of the present invention is an information processing device mounted on an electronic device including (a) a proximity sensor for detecting proximity of an object and (b) an acceleration sensor for detecting an acceleration, the information processing device including: an angle calculation section (angle determination section 62) for calculating, on the basis of the acceleration, an angle of a display surface (display section 21) of the electronic device with respect to a horizontal plane; and a lifting determination section for determining whether or not the electronic device has been lifted, the lifting determination section starting a process for determining whether or not the electronic device has been lifted in a case where the following conditions (i) and (ii) are satisfied: (i) the angle is within a predetermined angle range; and (ii) the result of detection by the proximity sensor is indicative of proximity.

As described above, before a user glances at the display surface of the electronic device, the user is in a posture leaning to some degree while the electronic device is held in a chest pocket of the user. In other words, the proximity detection result is NEAR and the electronic device is in the above-described 45° state. In other words, the electronic device is in the above-described pre-glance state. In the above configuration, lifting determination in the glance mode is started only in a case where the electronic device is in the pre-glance state. Therefore, lifting of the electronic device for glancing can be more reliably detected. Note that in a case where the electronic device is not in the pre-glance state, lifting determination may be carried out in a mode (e.g., the normal mode) that is not the glance mode. When the proximity of the electronic device is further taken into consideration as described above, it is possible to more reliably prevent a false detection of lifting of the electronic device.

An information processing device in accordance with Aspect 4 of the present invention is preferably configured to include: a first lifting determination section (first lifting determination section 64A) serving as a lifting determination section as described in any one of the above Aspects 1 to 3; and a second lifting determination section (second lifting determination section 64B, third lifting determination section 64C) for determining whether or not the electronic device has been lifted, without reference to the result of detection by the proximity sensor, the second lifting determination section being different from the first lifting determination section, in a case where one of the first lifting determination section and the second lifting determination section carries out a lifting determination process for a lifting motion, another lifting determination process for the lifting motion being initialized in another one of the first lifting determination section and the second lifting determination section. In the above configuration, lifting determination processes in a plurality of modes can be carried out in parallel. Further, with regard to one lifting motion, in a case where a lifting determination process is carried out in one mode, it is possible to prevent another lifting determination process(es) in the other mode(s) from being carried out.

An information processing device in accordance with Aspect 5 of the present invention is preferably configured to further include, in the Above Aspect 4: an angle calculation section for calculating, on the basis of the acceleration, an angle of a display surface of the electronic device with respect to a horizontal plane, the first lifting determination section and the second lifting determination section each determining that the electronic device has been lifted, in a case where (i) the manner of the change in the acceleration over time satisfies the acceleration condition and (ii) the angle is in a predetermined angle range, the angle calculation section determining whether or not the angle is within the predetermined angle range, on the basis of a preset range of the acceleration in a longitudinal direction (Y direction) of the display surface, and in the angle calculation section, an upper limit of the preset range of the acceleration in a lifting determination process carried out by the first lifting determination section being set lower than that in another lifting determination process carried out by the second lifting determination section. As described above, in the case of lifting of the electronic device for glancing, a change in acceleration in the Y direction is relatively smaller than that in the other case(s). Therefore, in the above configuration, it is possible to more reliably detect a lifting motion of the electronic device for glancing.

An electronic device in accordance with Aspect 6 of the present invention is preferably configured to include: an information processing device described in any one of the above Aspects 1 to 5; a proximity sensor for detecting proximity of an object; an acceleration sensor for detecting an acceleration; and a display surface for displaying an image. The above configuration produces an effect similar to that of the information processing device in accordance with an aspect of the present invention.

An electronic device in accordance with Aspect 7 of the present invention is preferably configured such that in the above Aspect 6: the display surface is a touch panel (12) having a function to detect proximity of an object; and the touch panel functions as the proximity sensor. In the above configuration, it is possible to cause the touch panel (display surface) to function also as the proximity sensor. This makes it possible to reduce the number of members of the electronic device.

A method in accordance with Aspect 8 of the present invention is a method for controlling an information processing device mounted on an electronic device including (a) a proximity sensor for detecting proximity of an object and (b) an acceleration sensor for detecting an acceleration, the method including: a standstill determination step of determining that the electronic device is in a standstill state in a case where a manner of change in the acceleration over time satisfies a predetermined standstill condition; and a lifting determination step of determining whether or not the electronic device has been lifted, in the lifting determination step, it being determined that the electronic device has been lifted, in a case where the following conditions (i) and (ii) are satisfied after the manner of the change in the acceleration over time has satisfied a predetermined acceleration condition: (i) in the standstill determination step, it is determined that the electronic device is in the standstill state; and a result of detection by the proximity sensor indicates a transition from proximity to non-proximity within a predetermined time range, the predetermined time range being set with reference to a standstill determination completion time point at which determination has completed in the standstill determination step. The above configuration produces an effect similar to that of the information processing device in accordance with an aspect of the present invention.

The information processing device in accordance with each aspect of the present invention may be realized by a computer. In this case, the scope of the present invention encompasses a control program for the information processing device which program realizes the information processing device by the computer by causing the computer to operate as each section (software element) of the information processing device, and a computer-readable storage medium in which the control program is stored.

Note that the present invention is not limited to the above embodiments, but can be altered within the scope of claims by a skilled person in the art. The present invention also encompasses, in its technical scope, any embodiment derived by combining technical means disclosed in differing embodiments. Further, a new technical feature can be formed by combining technical means disclosed in the embodiments.

REFERENCE SIGNS LIST

1 mobile terminal (electronic device)
10 control section (information processing device)
11 acceleration sensor
12 touch panel
14, 14a, 14b proximity sensor
21 display section (display surface)
62 angle calculation section (angle determination section)
63 standstill determination section
64A first lifting determination section (lifting determination section)
64B second lifting determination section
64C third lifting determination section (second lifting determination section)
tp standstill determination completion time point
ts time point from which proximity transition time range starts

The invention claimed is:

1. An information processing device mounted on an electronic device including (a) a proximity sensor for detecting proximity of an object and (b) an acceleration sensor for detecting an acceleration, the information processing device comprising:
a standstill determination section for determining that the electronic device is in a standstill state in a case where a manner of change in the acceleration over time satisfies a predetermined standstill condition; and
a lifting determination section for determining whether or not the electronic device has been lifted,
the lifting determination section determining that the electronic device has been lifted, in a case where the following conditions (i) and (ii) are satisfied after the manner of the change in the acceleration over time has satisfied a predetermined acceleration condition:
(i) the standstill determination section determines that the electronic device is in the standstill state; and
(ii) a result of detection by the proximity sensor indicates a transition from proximity to non-proximity within a predetermined time range, the predetermined time range being set with reference to a standstill determination completion time point at which the standstill determination section has determined that the electronic device is in the standstill state.

2. The information processing device as set forth in claim 1, wherein:
a time point from which the predetermined time range starts is preceding the standstill determination completion time point.

3. An image processing device comprising:
a first lifting determination section serving as a lifting determination section as recited in claim 1; and
a second lifting determination section for determining whether or not the electronic device has been lifted, without reference to the result of detection by the proximity sensor, the second lifting determination section being different from the first lifting determination section,
in a case where one of the first lifting determination section and the second lifting determination section carries out a lifting determination process for a lifting motion, another lifting determination process for the lifting motion being initialized in another one of the first lifting determination section and the second lifting determination section.

4. The information processing device as set forth in claim 3, further comprising:
an angle calculation section for calculating, on the basis of the acceleration, an angle of a display surface of the electronic device with respect to a horizontal plane,
the first lifting determination section and the second lifting determination section each determining that the electronic device has been lifted, in a case where (i) the manner of the change in the acceleration over time satisfies the acceleration condition and (ii) the angle is in a predetermined angle range,
the angle calculation section determining whether or not the angle is within the predetermined angle range, on the basis of a preset range of the acceleration in a longitudinal direction of the display surface, and in the angle calculation section, an upper limit of the preset range of the acceleration in a lifting determination process carried out by the first lifting determination section being set lower than that in another lifting determination process carried out by the second lifting determination section.

5. An electronic device comprising:
an information processing device recited in claim 1;
a proximity sensor for detecting proximity of an object;
an acceleration sensor for detecting an acceleration; and
a display surface for displaying an image.

6. The electronic device as set forth in claim 5, wherein:
the display surface is a touch panel having a function to detect proximity of an object; and
the touch panel functions as the proximity sensor.

7. An information processing device mounted on an electronic device including (a) a proximity sensor for detecting proximity of an object and (b) an acceleration sensor for detecting an acceleration, the information processing device comprising:
an angle calculation section for calculating, on the basis of the acceleration, an angle of a display surface of the electronic device with respect to a horizontal plane; and
a lifting determination section for determining whether or not the electronic device has been lifted,
the lifting determination section starting a process for determining whether or not the electronic device has been lifted in a case where the following conditions (i) and (ii) are satisfied:
(i) the angle is within a predetermined angle range; and
(ii) the result of detection by the proximity sensor is indicative of proximity of the object.

8. A method for controlling an information processing device mounted on an electronic device including (a) a proximity sensor for detecting proximity of an object and (b) an acceleration sensor for detecting an acceleration, the method comprising:
a standstill determination step of determining that the electronic device is in a standstill state in a case where a manner of change in the acceleration over time satisfies a predetermined standstill condition; and
a lifting determination step of determining whether or not the electronic device has been lifted,
in the lifting determination step, it being determined that the electronic device has been lifted, in a case where the following conditions (i) and (ii) are satisfied after the manner of the change in the acceleration over time has satisfied a predetermined acceleration condition:
(i) in the standstill determination step, it is determined that the electronic device is in the standstill state; and
(ii) a result of detection by the proximity sensor indicates a transition from proximity to non-proximity within a predetermined time range, the predetermined time range being set with reference to a standstill determination completion time point at which it is determined that the electronic device is in the standstill state in the standstill determination step.

* * * * *